United States Patent [19]

Findley et al.

[11] Patent Number: 4,481,838

[45] Date of Patent: Nov. 13, 1984

[54] ADJUSTABLE STEERING SHAFT

[75] Inventors: Samuel A. Findley, Coldwater; Duane T. Kubasiak, Bronson, both of Mich.

[73] Assignee: Douglas Components Corporation, Bronson, Mich.

[21] Appl. No.: 369,495

[22] Filed: Apr. 19, 1982

[51] Int. Cl.³ .............................................. B62D 1/18
[52] U.S. Cl. ........................................ 74/493; 74/531; 280/775; 403/104; 403/374
[58] Field of Search .................. 74/493, 531; 280/279, 280/775; 403/104, 374

[56] References Cited

U.S. PATENT DOCUMENTS

| 3,276,287 | 10/1966 | Albrecht | 74/493 |
| 3,434,368 | 3/1969 | Runkle | 74/531 X |
| 3,791,223 | 2/1974 | Treichel et al. | 74/531 X |
| 4,257,624 | 3/1981 | Hansen | 403/374 X |
| 4,402,236 | 9/1983 | Nishikawa | 74/531 X |

Primary Examiner—Allan D. Herrmann
Attorney, Agent, or Firm—Pearne, Gordon, Sessions, McCoy, Granger & Tilberry

[57] ABSTRACT

The innermost of two telescoping sub-portions of the steering shaft of an adjustable-length, tiltable steering column is received within the outermost shaft sub-portion, as is a wedge plug which interacts with the innermost sub-portion to wedgingly lock the linkage in adjusted, telescoped position when a threaded actuating rod is turned in one direction. The rod is interlocked with the innermost shaft sub-portion or the wedge plug to prevent relative axial movement between the rod and innermost shaft sub-portion or plug at least when the rod is turned in the other direction.

12 Claims, 6 Drawing Figures

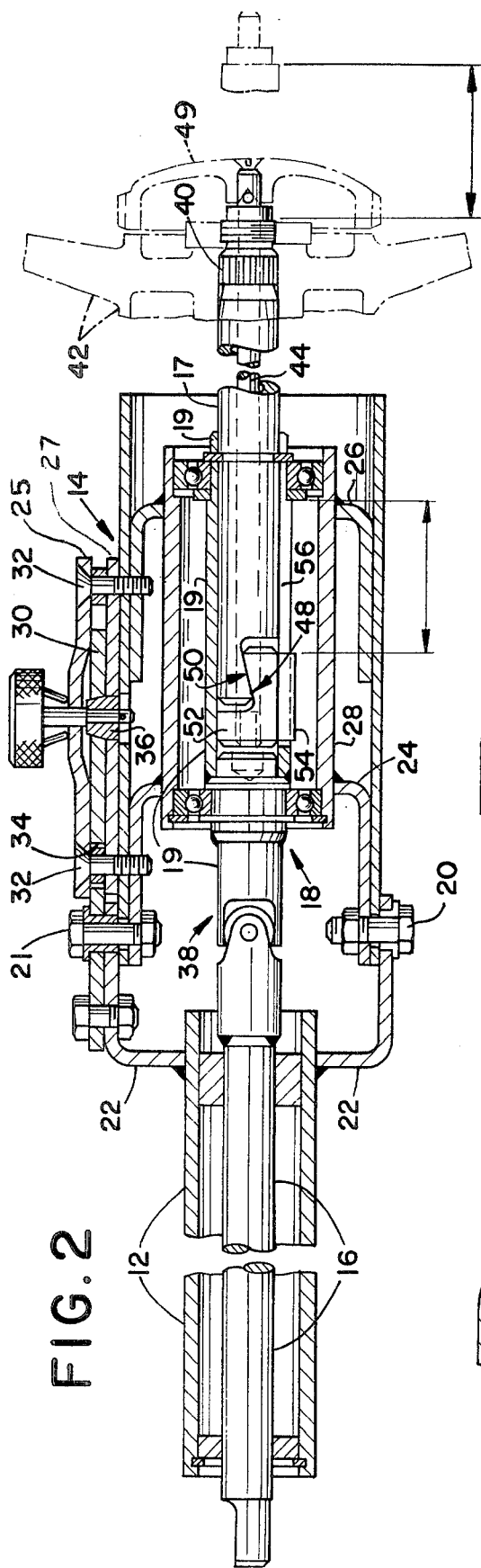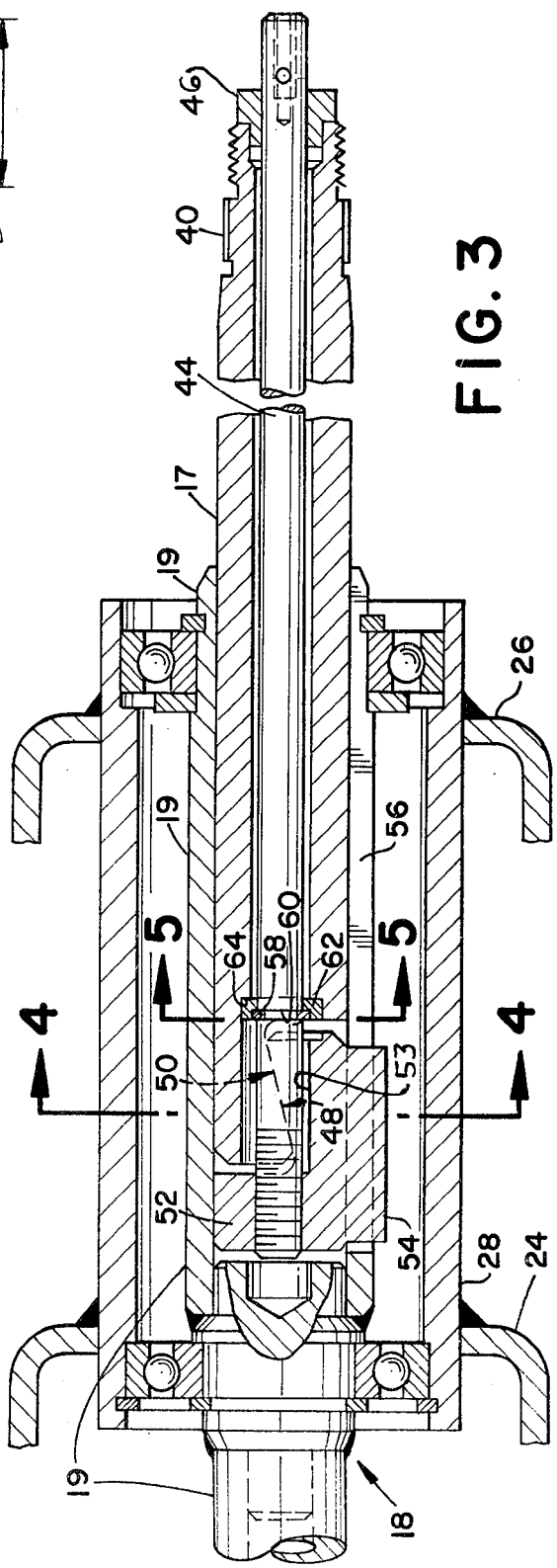

ADJUSTABLE STEERING SHAFT

BACKGROUND OF THE INVENTION

This invention relates to an adjustable steering column for a vehicle, and more particularly to the type of column which can be adjusted between several positions of vertical tilt and, within a limited range, between an infinite number of degrees of telescoping or longitudinal extension.

It is known to provide tilting and telescoping steering columns for industrial and agricultural vehicles, as well as for automobiles. Generally, these have been provided for the convenience of the operator. The ability to adjust a steering wheel to various positions of tilt and extension contributes to convenience by allowing operators to adjust for most comfortable steering and for easiest entrance and egress. Different operators may, and often do, prefer different adjustments, or the same operator may prefer different adjustments for different working conditions; for example, he or she may prefer to stand while operating a tractor or other vehicle for one purpose, and to sit while operating it for another purpose.

Unfortunately, the adjustability intended to be provided by tilting and telescoping steering columns of known design suitable for industrial and agricultural vehicles has often been, in important respects, more theoretical than practical. In particular, adjustment between different degrees of telescoping or longitudinal extension has often been difficult for the operator to accomplish. Indeed, such adjustment may be impossible to accomplish without pounding the column with a hammer, heavy wrench, or other implement, to thereby apply brute force to "break" the column away from a locked condition at its then-set degree of telescoping so that it can be shifted and set at another degree of telescoping. At the new setting, the column may again establish a locked condition which will again have to be "broken" by brute force upon subsequent adjustment. Under such circumstances, adjustment may not be worth the bother, particularly where true convenience would require frequent adjustment back and forth between positions.

Examples of prior art columns include Treichel et al. U.S. Pat. No. 3,791,223 and Hansen U.S. Pat. No. 4,257,624. Each of these patents illustrates a telescoping steering column whose length is adjustable over a continuous range between upper and lower limits of full extension and full retraction. In each of these patents, cam surfaces, a wedge nut (82 or 32), and a cooperating shaft member interact to wedge the nut and shaft member against an outer shaft member and lock the linkage in any selected degree of telescoping adjustment. However, such lock may be difficult to "break." It is intended that backing off or rotation of a lock-unlock knob (74 or 40) in the unlocking direction will release the linkage from the locked condition, but when a tight lock exists, the intended result may not occur. Instead, the control rod (72 or 37) may shift axially in such a way as to allow relative movement between the threadedly engaged nut and control rod without releasing the locked condition. The "brute force" approach of pounding or hammering may then be required to break the linkage from its locked condition.

SUMMARY OF THE INVENTION

According to the present invention, an improved steering column is provided which minimizes or totally eliminates the problem of breaking away from locked condition. In the present invention, means is provided for constraining a threaded control rod member against certain relative axial movement while it is being rotated in the direction intended to release the column from locked condition. Such constraint is imposed in such a way that axial movement of a wedge nut engaged with the rod is positively forced, thereby forcing a breakaway from the locked condition. The result is a telescoping steering column whose length can be adjusted, with true convenience, over a continuous range of column lengths.

BRIEF DESCRIPTION OF THE DRAWINGS

FIG. 2 is a fragmentary cross section, on an enlarged scale, taken on the plane of line 2—2 in FIG. 1.

FIG. 3 is a view on a still larger scale of a portion of FIG. 2, and with some additional cross-sectioning of the illustrated parts.

Figure 1:
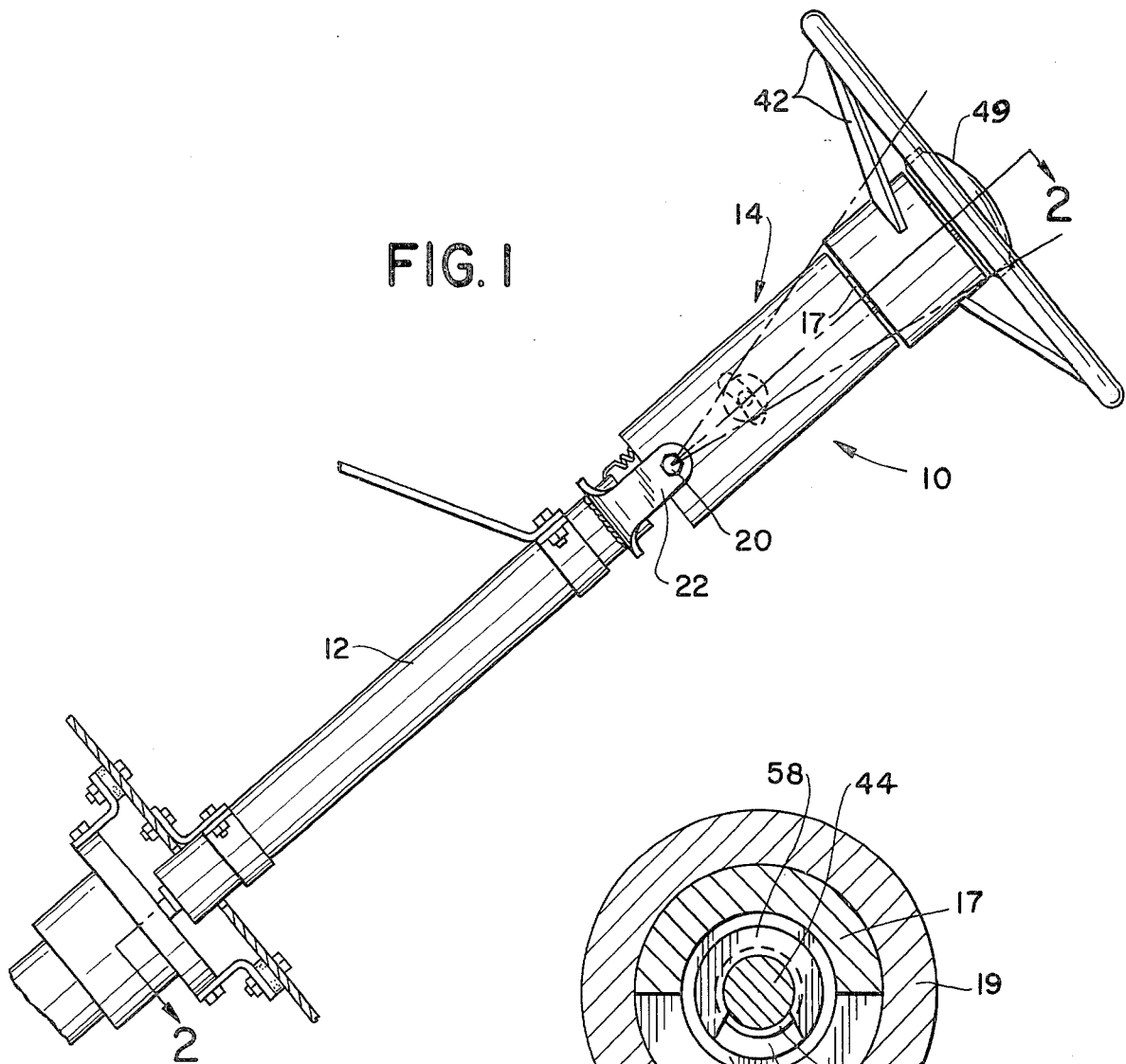
FIG. 1 is a side elevation of a steering column illustrating one embodiment of the invention.
Figure 5:
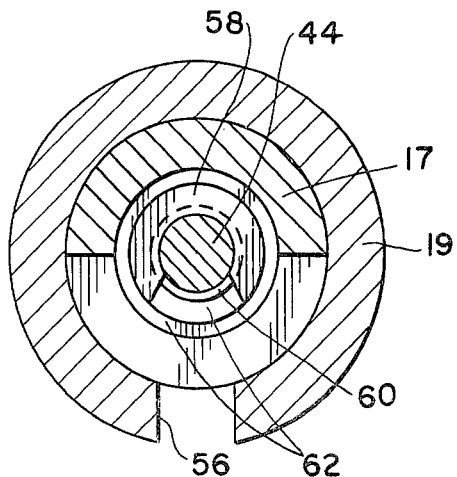
FIG. 5 is a cross section, on a further enlarged scale, taken on the plane of line 5—5 in FIG. 3.

In the following description, numbers within parentheses refer to FIGURE numbers.

A steering column generally indicated at 10 (1) includes a lower column portion 12 (1, 2) fixed against rotation and a lower steering shaft portion 16 (2) mounted within the lower column portion and adapted to control steering means for the vehicle. An upper column portion generally indicated at 14 (1, 2) is pivotally mounted to the lower column portion 12 by pivot bolts 20 (1, 2) and 21 (2) via a lower column bracket 22 (1, 2) fixed to the lower column portion 12.

The upper column portion 14 includes brackets 24 and 26 (2, 3) and a bearing support sleeve 28 (2, 3, 4). A fixed detent plate or arm 30 (2) is bolted to the lower column bracket 22 and extends upwardly between moving detent plates 25 and 27 (2). The moving detent plates are joined by suitable threaded fasteners 32 and are held apart by spacer sleeves through which the threaded fasteners pass, as shown. The spacer sleeve associated with the lowermost threaded fastener 32 is received within an arcuate slot 34 (2) formed in the fixed detent arm 30. The slot 34 is seen in cross section in the drawings. This slot accommodates the pivoting movement of the moving detent plates 25, 27 relative to the fixed detent arm 30. A detent proper 36 (2) is received in any one of several mating holes formed in the fixed detent arm 30 to thereby fix the degree of tilt of the steering column. The detent is temporarily released by depression of the associated knob and shaft which are normally spring-biased to their extended positions, as illustrated, thus normally maintaining the detent proper in the seated position.

The lower steering shaft portion 16 is connected to an upper steering shaft portion generally indicated at 18 (2, 3) at a universal joint 38 (2). The upper steering shaft portion 18 includes an upper sub-portion 17 (1-5) and a lower sub-portion 19 (2-5). Sub-portions 17 and 19 are associated with each other in telescoping relationship. The lower end of the lower telescoping sub-portion is directly connected to the universal joint 38. Means such as the splines 40 (2, 3) are provided for mounting a steering wheel 42 (1, 2) at the upper end of the upper telescoping sub-portion.

A manually rotatable control rod 44 (2-5) is mounted in and extends through the upper sub-portion 17. The control rod 44 may be supported at its upper end by a bearing plug 46 (3). Manually drivable rotation means such as the knob 49 (1, 2) is provided at the upper end of the control rod 44. The knob may be keyed to the control rod by a suitable slot and pin connection, as indicated in FIGS. 2 and 3. The control rod 44 has screw threads adjacent its lower end, as shown in the drawings.

In the illustrated embodiment, the upper sub-portion 17 will be seen to be the innermost of the two sub-portions 17 and 19 of the upper shaft portion 18. The sub-portion that is innermost, in this case sub-portion 17, is provided at its end with inclined cam surface 48 (2, 3) which is reentrant in the illustrated preferred embodiment. A wedge plug 52 (2-4) is telescoped within the outermost of the sub-portions of the upper shaft portion, which, in the embodiment being described, is the lower sub-portion 19. The wedge plug 52 has an inclined cam surface 50 (2,3) which is engageable with the cam surface 48. The wedge plug 52 may be provided with a tongue 54 (2-4) which is received in a slot 56 (2, 3, 5) formed in the shaft sub-portion 19 in order to key the members 52 and 19 against relative rotation. The upper end of the wedge plug 52 has a longitudinal groove 53 (4, 5) which accommodates the control rod 44. The lower end of the wedge plug 52 is threadedly engaged with the rotatable control rod 44 for intended axial shifting of the wedge plug and rotatable control rod, relative to each other and in response to rotation of the rod, in directions for respective locking and releasing movement. In locking movement, the wedge plug and innermost sub-portion of the shaft are axially shifted relatively to each other to force the inclined cam surfaces 48 and 50 together and thereby force the wedge plug 52 and the innermost sub-portion 17 into locking engagement with the outermost sub-portion 19. In the intended releasing movement, the wedge plug and innermost sub-portion of the shaft are axially shifted in a releasing direction to release such engagement. However, in the apparatus as so far described, such releasing movement is not forced to occur by, and may not be accomplished by, the rotation of the control rod in the rotational direction corresponding to intended relative axial shifting of the wedge plug and innermost shaft sub-portion for releasing movement. Instead, rotation of the knob 49 so as to turn the control rod 44 in the intended releasing direction may merely cause the rod 44 and knob 49 to start to move axially by threaded engagement with the wedge plug 52 without effecting any relative shifting between the wedge plug 52 and innermost shaft sub-portion 17. This is prevented in one version of the present invention by locking the rod and innermost shaft sub-portion against relative movement, at least during rotation of the rod 44 in the release direction, thereby allowing relative axial shifting of the wedge plug 52 and innermost shaft sub-portion 17 to be positively forced by rotation of the rod in the release direction. When the rod 44 is turned in a direction to tend to move the cam surfaces 48 and 50 apart, such moving apart is positively forced by engagement of the control knob 49 and adjacent end of the sub-portion 17 formed by the bearing 46. In the illustrated embodiment, a snap-ring or retaining ring 58 (3, 5) is received in a ring-groove 60 (3, 5) formed in the control rod 44. A ring retainer 62 (3, 5) may surround and back the ring 58 and engages the innermost shaft sub-portion 17 at a shoulder 64 (3).

Figure 6:
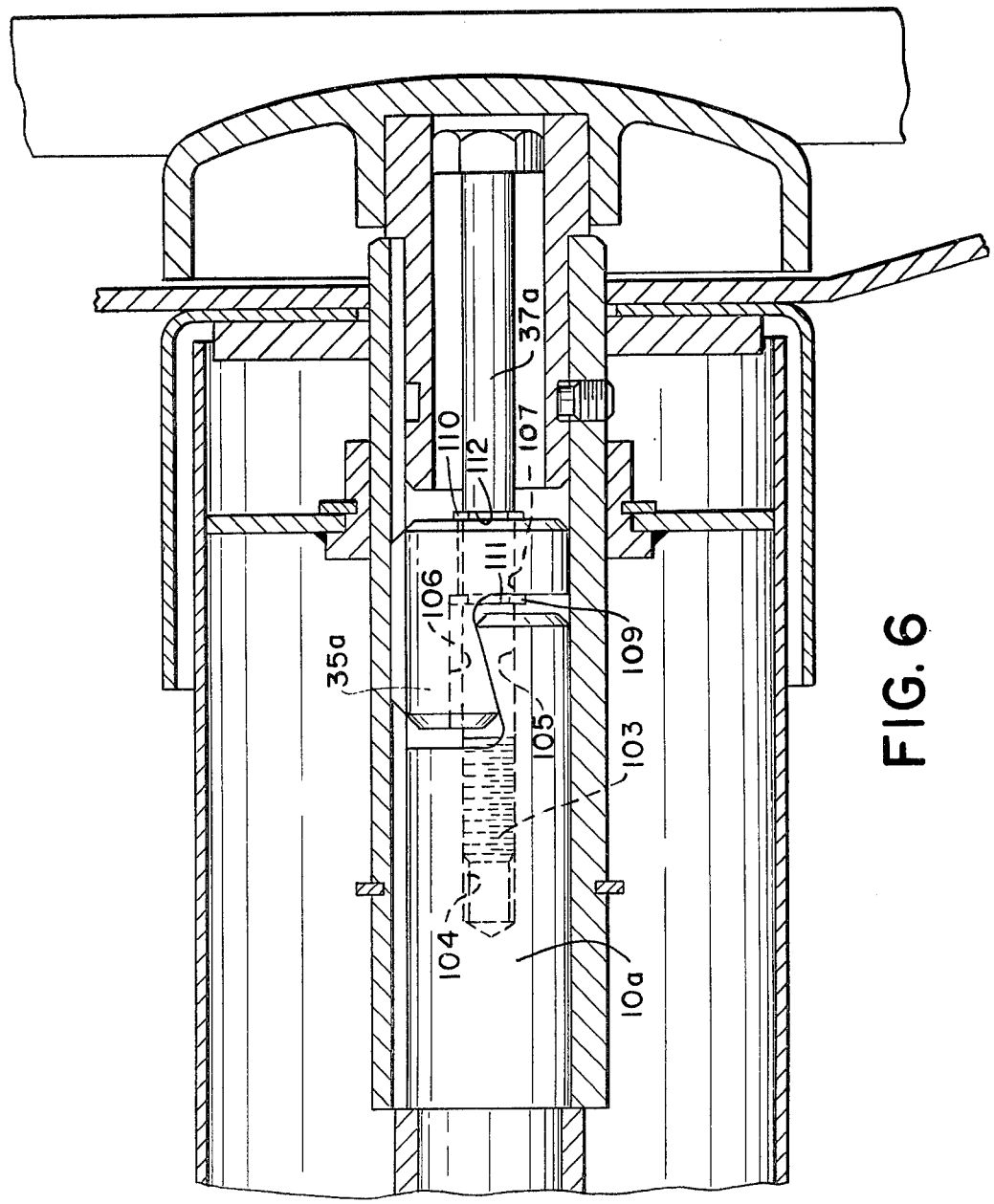
FIG. 6 is a fragmentary, cross-sectional view showing another embodiment of the invention.

Variations in structure may be made without departing from the teaching of the invention as claimed below. For example, constructions may be employed wherein in respect of the upper steering shaft portion, the innermost sub-portion is the lower sub-portion rather than the upper sub-portion as described. For example, a construction may be employed identical to that shown in aforementioned U.S. Pat. No. 4,257,624, whose disclosure is adapted by reference herein, except that the structure is modified as illustrated in FIG. 6 of the present disclosure. In FIG. 6, like reference numerals are used for elements corresponding to those shown in such patent (see particularly FIG. 3 thereof) except that the letter "a" is added. Elements of FIG. 6 without the letter "a" added are new elements or modifications added to the disclosure of such patent. For example, in FIG. 6 control rod 37a and wedge plug 35a correspond respectively to control rod 37 and wedge plug 35 in such patent, but retaining rings 109 and 110 and threaded interconnection 103 have no counterparts in such patent. The unnumbered elements in FIG. 6 may be identical to corresponding elements shown in such patent.

Figure 4:
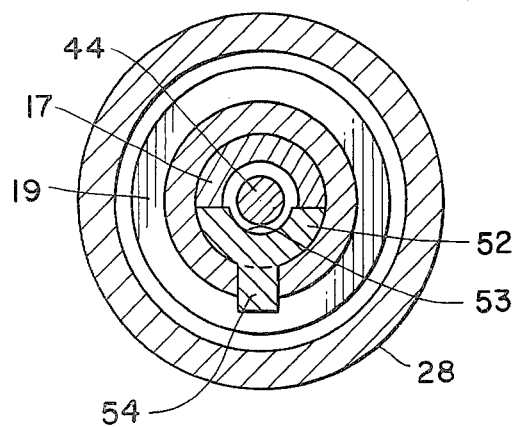
FIG. 4 is a cross section taken on the plane of line 4—4 in FIG. 3.

In such modification according to the present invention, and with reference to FIG. 6, the control rod 37a is not threadedly connected to the wedge plug 35a but, rather, is threadedly connected at 103 to the innermost sub-portion 10a of the upper steering shaft portion, such innermost sub-portion comprising the lower sub-portion rather than the upper sub-portion of the upper steering shaft portion. For that purpose, sub-portion 10a is provided with a threaded bore 104 and with an axially extending clearance groove 105 (similar to the groove 53 formed in wedge plug 52, as shown in FIG. 4). The wedge plug 35a is provided with a similar clearance groove 106 and receives the rod 37a in an unthreaded bore 107, and is locked against relative axial movement therewith by split snap-rings or retaining rings 109 and 110 received in annular ring grooves 111 and 112 formed in control rod 37a.

It will be noted that in such version the control rod 37a is locked against relative axial movement with respect to the wedge plug 35a, rather than with respect to the innermost shaft sub-portion 10a, the latter being the element that is threadedly connected to the control rod. The invention contemplates that the one of these two elements (wedge plug and innermost shaft sub-portion) that is not threadedly connected to the control rod will be locked against axial movement relative to the control rod.

Although reentrant camming surfaces are shown and preferred, non-reentrant camming surfaces similar to those shown in aforementioned U.S. Pat. No. 3,791,223 may be employed.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. An adjustable steering column for a vehicle comprising a lower column portion fixed against rotation, a lower steering shaft portion rotatably mounted within the lower column portion and adapted to control steering means for the vehicle, an upper column portion, means for pivotally mounting the upper column portion to the lower column portion for pivotal movement between a plurality of pivotal positions, means for manually locking the upper column portion in a selected one of said plurality of pivotal positions, an upper steering shaft portion rotatably mounted within the upper column portion, a universal joint connecting the upper and lower steering shaft portions at said means for pivotally mounting the upper steering shaft portion, said upper steering shaft portion including upper and lower sub-portions at least one of which is a quill shaft, said sub-portions being associated in telescoping relationship with one being the outermost of the two and the other the innermost, the lower end of the lower telescoping sub-portion being directly connected to the universal joint, steering wheel mounting means at the upper end of the upper telescoping sub-portion, a manually rotatable control rod mounted in and extending through the upper sub-portion and having manually drivable rotation means at its upper end and screw threads adjacent its lower end, an inclined first cam surface at an end of the innermost of the sub-portions, a wedge plug telescoped within the outermost of said sub-portions, the wedge plug having an inclined second cam surface engageable with the first cam surface whereby axial shifting of the wedge plug in a locking direction with respect to the said innermost sub-portion forces the inclined first and second cam surfaces together to force the plug and said innermost sub-portion into locking engagement with said outermost sub-portion, and axial shifting of the wedge plug in a releasing direction with respect to said innermost sub-portion releases said locking engagement, the wedge plug and said innermost sub-portion surrounding the lower end of the rotatable control rod with one of them threadedly engaged with the control rod for axial shifting of the wedge plug and innermost sub-portion, relative to each other and in response to rotation of the rod, in directions for respective locking and releasing movement, and means for locking the rotatable control rod and the one of said innermost sub-portion and wedge plug that is not threadedly engaged with the control rod against relative axial movement at least when the control rod is rotated in said direction for releasing movement to thereby positively force axial shifting of the wedge plug in the releasing direction with respect to said innermost sub-portion of said upper steering shaft portion.

2. Apparatus as in claim 1, in which said means for locking locks the rotatable control rod and said innermost sub-portion against relative axial movement.

3. Apparatus as in claim 1, in which said means for locking locks the rotatable control rod and said wedge plug against relative axial movement.

4. Apparatus as in claim 1, in which the upper and lower sub-portions of the upper steering shaft portion comprise an upper quill shaft and a lower quill shaft.

5. Apparatus as in claim 4, in which the upper quill shaft is the innermost of the two and is telescopingly received within the lower quill shaft which is the outermost of the two.

6. Apparatus as in claim 5, in which the wedge plug is telescoped within the lower quill shaft between the lower end thereof and the upper quill shaft.

7. Apparatus as in claim 1, in which the axial shifting of the wedge plug in a releasing direction with respect to said innermost sub-portion of said upper steering shaft portion is an axial shifting of the wedge plug toward said innermost sub-portion.

8. Apparatus as in claim 7, in which the said first and second cam surfaces are reentrantly inclined.

9. An adjustable steering column for a vehicle comprising a lower column portion fixed against rotation, a lower steering shaft portion rotatably mounted within the lower column portion and adapted to control steering means for the vehicle, an upper column portion, means for pivotally mounting the upper column portion to the lower column portion for pivotal movement between a plurality of pivotal positions, means for manually locking the upper column portion in a selected one of said plurality of pivotal positions, an upper steering shaft portion rotatably mounted within the upper column portion, a universal joint connecting the upper and lower steering shaft portions at said means for pivotally mounting, the upper steering shaft portion including a lower quill shaft directly connected to the universal joint and an upper quill shaft telescoped within the lower quill shaft, the upper quill shaft having steering wheel mounting means at its upper end and an inclined first cam surface at its lower end, a manually rotatable control rod mounted in and extending through the upper quill shaft and having a knob on its upper end on the upper side of said steering wheel mounting means and screw threads on its lower end, a wedge plug telescoped within the lower quill shaft between the lower end thereof and the upper quill shaft, the wedge plug having an inclined second cam surface engageable with the first cam surface whereby axial shifting of the wedge plug in a locking direction with respect to the upper quill shaft forces the inclined first and second cam surfaces together to force the plug and the lower end of the upper quill shaft into locking engagement with the lower quill shaft, and axial shifting of the wedge plug in a releasing direction with respect to the upper quill shaft releases said locking engagement, the wedge plug being threadedly mounted on the lower end of the rotatable control rod for axial shifting of the wedge plug and rotatable control rod, relative to each other and in response to rotation of the rod, in directions for respective locking and releasing movement corresponding to said locking and releasing directions of said axial shifting of the wedge plug with respect to the upper quill shaft, and means for locking the rotatable control rod and the upper quill shaft against relative axial movement at least when the control rod is rotated in said direction for releasing movement to thereby positively force axial shifting of the wedge plug in the releasing direction with respect to the upper quill shaft.

10. Apparatus as in claim 9, in which the axial shifting of the wedge plug in a releasing direction with respect to the upper quill shaft is an axial shifting of the wedge plug toward the upper quill shaft.

11. Apparatus as in claim 9, in which the axial shifting of the wedge plug in a releasing direction with respect to the upper quill shaft is an axial shifting of the wedge plug away from the upper quill shaft.

12. In an adjustable steering column for a vehicle, a lower quill shaft, an upper quill shaft telescoped therein, the upper quill shaft having an inclined first cam surface at its lower end, a manually rotatable control rod extending through the upper quill shaft and having screw threads on its lower end, the upper quill shaft being free of engagement with said screw threads, a wedge plug telescoped within the lower quill shaft between the lower end thereof and the upper quill shaft, the wedge plug having an inclined second cam surface engageable with the first cam surface, said wedge plug being threadedly engaged with the screw threads at the lower end of the rotatable control rod, and means locking the rotatable control rod and upper quill shaft against relative axial movement, whereby rotation of said control rod in said wedge plug in one direction positively drives said cam surfaces axially together for radial engagement of at least one of said wedge plug and upper quill shaft elements against said lower quill shaft and in the other direction positively drives said cam surfaces axially apart for radial retraction of such one element away from said lower quill shaft.

* * * * *